(12) United States Patent
Kanamoto et al.

(10) Patent No.: US 10,489,092 B2
(45) Date of Patent: Nov. 26, 2019

(54) PRINTING APPARATUS CONFIGURED TO EXECUTE PRINTING OF A PRINT JOB WHEN AN N-IN-ONE PRINTING SETTING AND AN INSERT SHEET FUNCTION ARE DESIGNATED, AND RELATED METHOD OF CONTROLLING THE PRINTING APPARATUS AND A STORAGE MEDIUM

(71) Applicant: CANON KABUSHIKI KAISHA, Tokyo (JP)

(72) Inventors: Yoshiji Kanamoto, Tokyo (JP); Toshihiko Iida, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/185,930

(22) Filed: Nov. 9, 2018

(65) Prior Publication Data

US 2019/0146731 A1 May 16, 2019

(30) Foreign Application Priority Data

Nov. 15, 2017 (JP) ................................. 2017-220128

(51) Int. Cl.
*G06F 15/00* (2006.01)
*G06F 3/12* (2006.01)
*G06K 1/00* (2006.01)

(52) U.S. Cl.
CPC ............ *G06F 3/1219* (2013.01); *G06F 3/125* (2013.01); *G06F 3/1242* (2013.01); *G06F 3/1254* (2013.01); *G06F 3/1282* (2013.01)

(58) Field of Classification Search
CPC ...... G06F 3/1219; G06F 3/1242; G06F 3/125; G06F 3/1254
USPC ............................. 358/1.13, 1.15, 1.14, 1.1
See application file for complete search history.

(56) References Cited

U.S. PATENT DOCUMENTS

| | | | | |
|---|---|---|---|---|
| 2015/0301769 A1* | 10/2015 | Yamashita | ............ | G06F 3/1205 358/1.15 |
| 2016/0350633 A1* | 12/2016 | Suwabe | ............... | G06K 15/404 |
| 2019/0011869 A1* | 1/2019 | Higashiura | .......... | G03G 15/655 |

FOREIGN PATENT DOCUMENTS

JP       2006-159845 A       6/2006

* cited by examiner

*Primary Examiner* — Douglas Q Tran
(74) *Attorney, Agent, or Firm* — Venable, LLP

(57) ABSTRACT

A printing apparatus functions as a determination unit that determines whether or not a print job includes an N-in-one printing setting and a setting of a function for designating a page position and executing the function with respect to the page position, an obtaining unit that obtains, when the print job includes the N-in-one printing setting and the setting of the function, a position after the N-in-one printing for executing the function, and a control unit that executes, in a case in which the position can be specified based on a unit of a sheet on which an image after N-in-one printing is to be printed, printing in accordance with the print job, and, in a case in which the position cannot be specified based on the unit of sheet, to control to perform printing of the print job by enabling only the N-in-one printing setting.

11 Claims, 14 Drawing Sheets

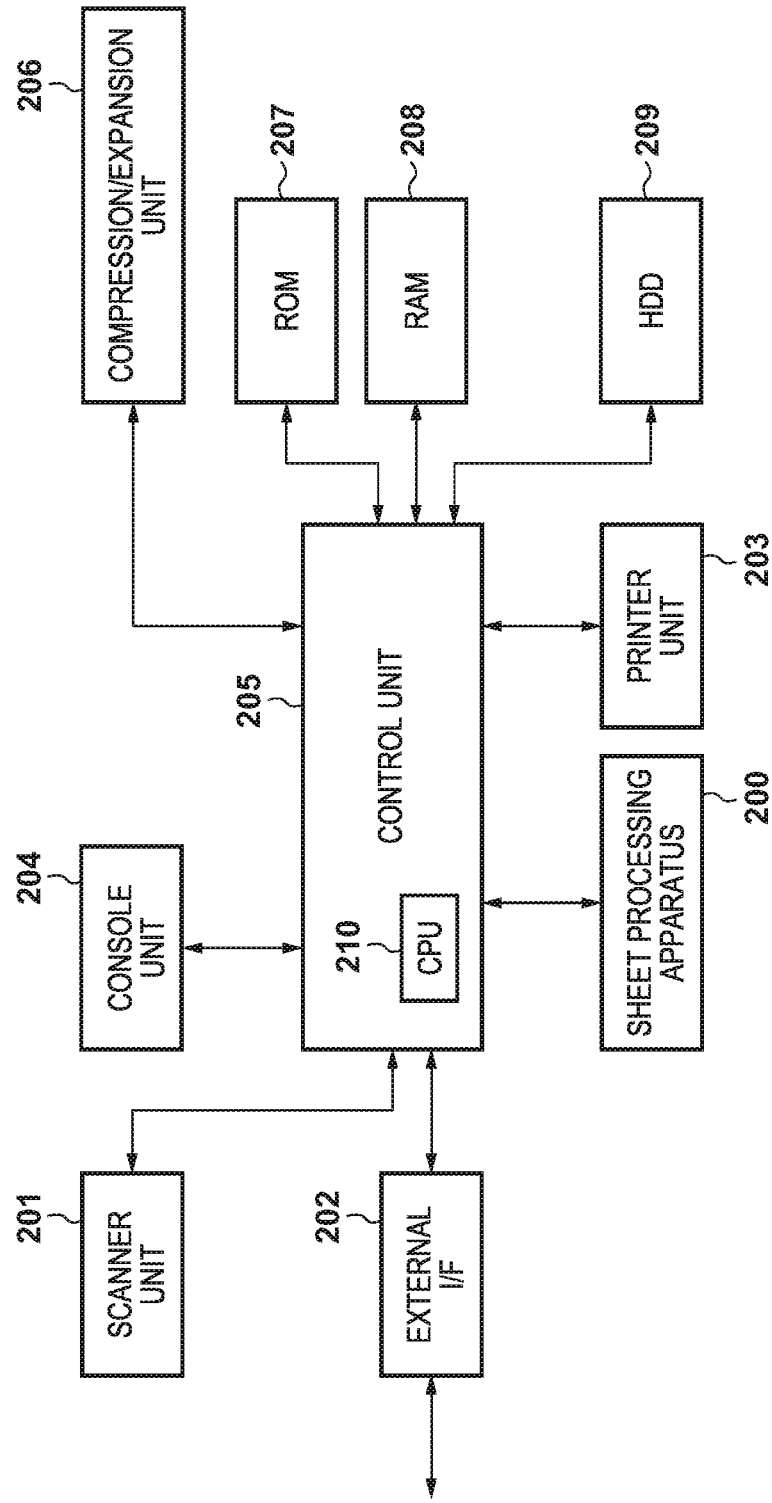

```
<LayoutPreparationParams PartIDKeys="RunIndex">
  <LayoutPreparationParams RunIndex="4~-1">     ~ 501
502 ~<InsertSheetSheetFormat="Blank" SheetType="InsertSheet"
  SheetUsage="Header">
    <MediaRefrRef="MED_001"/>  ~ 503
  </InsertSheet>
  </LayoutPreparationParams>
</LayoutPreparationParams>
```

```
<LayoutPreparationParams PartIDKeys="RunIndex" NumberUp="2 2">
<LayoutPreparationParams RunIndex="4~-1">            ~602
<InsertSheetSheetFormat="Blank" SheetType="InsertSheet"
SheetUsage="Header">
<MediaRefrRef="MED_001"/>  ~604
</InsertSheet>
</LayoutPreparationParams>
</LayoutPreparationParams>
```
601
603

FIG. 7A
```
<LayoutPreparationParams PartIDKeys="RunIndex" NumberUp="2 2">
<LayoutPreparationParams RunIndex="3~-1"> ─── 701
<InsertSheetSheetFormat="Blank" SheetType="InsertSheet"
SheetUsage="Header">
<MediaRefrRef="MED_001"/>
</InsertSheet>
</LayoutPreparationParams>
</LayoutPreparationParams>
```
FIG. 7B
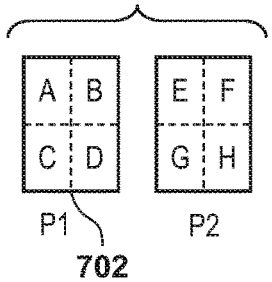
FIG. 7C
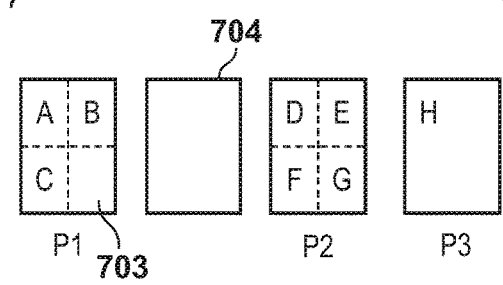

$$Y = \begin{cases} \{(X-1)/N\}+1 & \text{WHEN CALCULATION RESULT OF FORMULA } [\{(X-1)/N\}+1] \text{ IS INTEGER} \\ -1 & \text{WHEN CALCULATION RESULT OF FORMULA } [\{(X-1)/N\}+1] \text{ IS NON-INTEGER} \end{cases}$$

```
<LayoutPreparationParams>
</LayoutPreparationParams>
<DigitalPrintingParams PartIDKeys="RunIndex">
<DigitalPrintingParams RunIndex="4~4">  ~1201
  <Media Ref rRef="MED002"/>  ~1202
</DigitalPrintingParams>
</DigitalPrintingParams>
```

FIG. 13A
```
<LayoutPreparationParamsNumberUp="2 2">  ~1301
</LayoutPreparationParams>
<DigitalPrintingParams PartIDKeys="RunIndex">
<DigitalPrintingParams RunIndex="4~4">  ~1302
   <MediaRef rRef="MED002"/>  ~1303
</DigitalPrintingParams>
</DigitalPrintingParams>
```
FIG. 13B
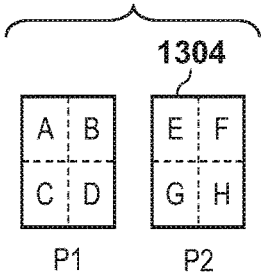
1304
P1  P2
FIG. 13C
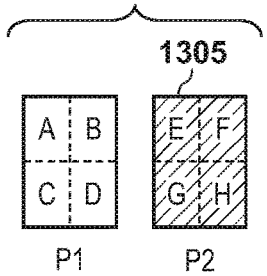
1305
P1  P2
FIG. 13D
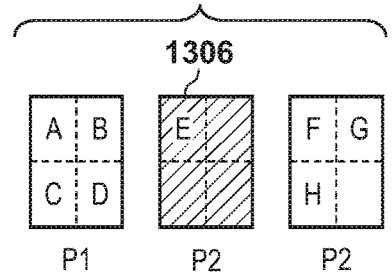
1306
P1  P2  P2

PRINTING APPARATUS CONFIGURED TO EXECUTE PRINTING OF A PRINT JOB WHEN AN N-IN-ONE PRINTING SETTING AND AN INSERT SHEET FUNCTION ARE DESIGNATED, AND RELATED METHOD OF CONTROLLING THE PRINTING APPARATUS AND A STORAGE MEDIUM

This application claims the benefit of Japanese Patent Application No. 2017-220128, filed Nov. 15, 2017, which is hereby incorporated by reference herein in its entirety.

BACKGROUND OF THE INVENTION

Field of the Invention

The present invention relates to a printing apparatus, a method of controlling the printing apparatus, and a storage medium.

Description of the Related Art

Conventionally, an N-in-one printing function for converting a plurality of pages to reduced images, arranging this plurality of reduced images in a page order on the same surface, and forming this plurality of reduced images as one composite image is known. This N-in-one printing function is also referred to as a number-up function. It is possible to designate the number of pages that are aggregated in this case, and a case of compositing images for four pages, for example, into one image is referred to as the N-in-one printing function with the number of aggregated sheets as "4". In addition, this N-in-one printing is described as "4-in-1 printing".

In addition, an insert sheet function for designating a specific page, and inserting a sheet that is different from print material before the page is also known. By using such an insert sheet function, even with a monochrome printer, for example, it is possible to create print material that includes a color page as a result by inserting, at a designated page position, print material that was separately printed in advance by a color printer.

The N-in-one printing function and the insert sheet function described above are functions that are widely used. Using both in combination is not, however, typical conventionally. A reason that is described by an example of applying an insert sheet function to a page description language (PDL) job of ten pages where a number of aggregated pages is "4", for example. Because an aggregation function creates an image to print on a respective sheet in accordance with the number of aggregated pages, in the case of N-in-1 for example, an image for one sheet is generated by N original images. It goes without saying however, that an insert sheet is inserted between sheets. Accordingly, when a page position designated as an insertion position is positioned between pages that are aggregated in one sheet, it is not physically possible to insert the insert sheet at the designated page position. For example, when printing with 4-in-1 printing, it is physically impossible to insert an insert sheet immediately prior to the third page (between the second page and the third page).

To resolve such a problem, conventionally it was typical to make these functions mutually exclusive so that the insert sheet function and the N-in-one printing function are not available at the same time. Alternatively, one strategy for have these two functions coexist without mutual exclusion is proposed by Japanese Patent Laid-Open No. 2006-159845, for example. According to this document, when an insertion position is between pages aggregated to one sheet, the image for the page subsequent to the insertion position of sheet is blanked, and the insert sheet is inserted immediately after the sheet. On the next sheet, printing is performed for aggregated images that aggregate images for subsequent pages, including the image of the page that was blanked. For example, a description is given for an example in which, when printing images for ten pages by 4-in-1 printing, the insert sheet function is designated with an insertion position set to immediately prior to the third page. In this case, in the aggregated images for the first sheet, the page locations for which the third page and the fourth page were scheduled to be composited are blanked. By this arrangement, in the aggregated images for the first sheet, only the aggregated images for the first page and the second page are printed. Aggregated images for the third to sixth pages are printed on the second sheet. The insert sheet is inserted immediately prior to the second sheet to allow for coexistence of the aggregation function and the insert sheet function.

In a case in which the N-in-one printing function and the insert sheet function are caused to coexist by the technique described above, there is a problem such as follows. In the former case of having mutual exclusion for the N-in-one printing function and the insert sheet function, conventionally, even with conditions where there is no problem after combining these functions, it is not possible to use these functions. In other words, there is a problem that being able to create a wide variety of products is impaired.

For the latter case, by printing while blanking aggregated images, it is possible for the number of print sheets to increase as a result. Because the main purpose of an N-in-one printing function is to suppress the number of print sheets, creating a condition in which the number of print sheets increases impairs the original intention.

SUMMARY OF THE INVENTION

An aspect of the present invention is to eliminate the above-mentioned problem with conventional technology.

The feature of the present invention is to provide a technique for allowing coexistence of an N-in-one printing function and a function used to designate pages, and preventing an increase in the number of excess printed sheets that accompanies the coexistence of these functions.

According to a first aspect, the present invention provides a printing apparatus operable to receive a print job and to perform printing, the printing apparatus comprising a memory device that stores a set of instructions, and at least one processor that executes the instructions stored in the memory to cause the printing apparatus to function as a determination unit configured to determine whether or not the print job includes an N-in-one printing setting and a setting of a function for designating a page position and executing with respect to the page position, an obtaining unit configured to obtain, when the determination unit determines that the print job includes the N-in-one printing setting and the setting of the function, based on a number of aggregated pages of the N-in-one printing and the page position, a position after the N-in-one printing for applying the function, and a control unit configured to execute printing, in a case in which the position can be specified based on a unit of a sheet on which an image after N-in-one printing is to be printed, in accordance with the print job, and, in a case in which the position cannot be specified based on the unit of the sheet, to control to perform printing of the print job by enabling only the N-in-one printing setting.

According to a second aspect, the present invention provides a printing apparatus operable to receive a print job and to perform printing, the printing apparatus comprising a memory device that stores a set of instructions and at least one processor that executes the instructions stored in the memory to cause the printing apparatus function as a determination unit configured to determine whether or not the print job includes an N-in-one printing setting and a setting of an exceptional page function for designating a page position and executing with respect to the page position, an obtaining unit configured to obtain, when the determination unit determines that the print job includes the N-in-one printing setting and the setting of the exceptional page function, based on a number of aggregated pages of the N-in-one printing and the page position, a position of a sheet after the N-in-one printing for applying the exceptional page function, and a control unit configured to control so as to execute printing in accordance with the print job to apply the exceptional page function to the sheet position obtained by the obtaining unit.

According to a third aspect, the present invention provides a method of controlling a printing apparatus operable to receive a print job and to perform printing, the method comprising determining whether or not the print job includes an N-in-one printing setting and a setting of a function for designating a page position and executing with respect to the page position, obtaining, upon determining that the print job includes the N-in-one printing setting and the setting of the function, based on a number of aggregated pages of the N-in-one printing and the page position, a position after the N-in-one printing for applying the function, and, in a case in which the position can be specified based on a unit of a sheet on which an image after N-in-one printing is to be printed, executing printing in accordance with the print job, and, in a case in which the position cannot be specified based on the unit of sheet, controlling to perform printing of the print job by enabling only the N-in-one printing setting.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a block diagram for describing a configuration of a multifunction peripheral (MFP) according to the first embodiment.

FIGS. 7A through 7C depict views illustrating an example of a command when the N-in-one printing function and an insert sheet function are designated at the same time and a result thereof.

FIGS. 13A through 13D depict views illustrating examples in which an N-in-one printing setting and an exceptional page function are used in the second embodiment.

DESCRIPTION OF THE EMBODIMENTS

Embodiments of the present invention will be described hereafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Figure 1:
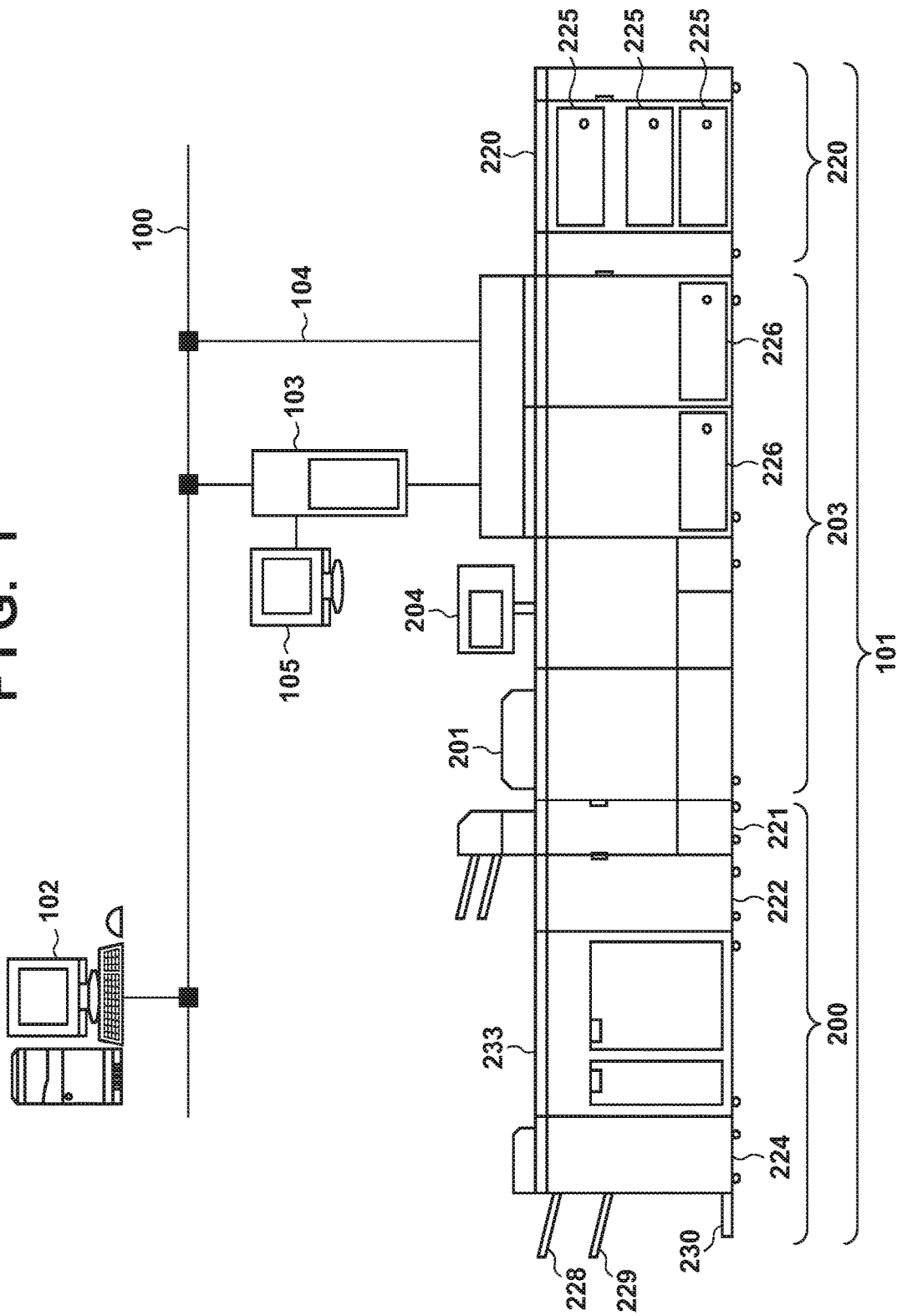
FIG. 1 depicts a view illustrating a print processing system according to a first embodiment of the present invention.

FIG. 1 depicts a view illustrating a print processing system according to the first embodiment of the present invention. In the first embodiment, a description is given by exemplifying a multifunction peripheral (MFP) 101 as an example of an image forming apparatus, and exemplifying a personal computer (PC) 102 as an example of an information processing apparatus. The MFP 101 and the PC 102 are communicably connected via a network 100. Note that, in the first embodiment, a case in which one information processing apparatus is provided in a print processing system is exemplified, but the MFP 101 and a plurality of information processing apparatuses may be communicably connected via the network 100. Although a case in which the print processing system according to the first embodiment includes an image forming apparatus and an information processing apparatus is exemplified, the present invention is not limited to this. The image forming apparatus may be a print processing system, for example. Additionally, in image forming processing that the MFP 101 can independently execute, such as an execution of a copy job, or the like, a configuration may be such that an information processing apparatus connected to the network 100 is unnecessary.

First, an explanation is given regarding the PC 102. The PC 102 can execute various programs, such as an application program for inputting a print job. Additionally, a printer driver that includes a function for converting print data into a printer language supported by the MFP 101 is installed in the PC 102. A user who desires to perform printing can perform a print instruction from various applications, or the like, that are executed by the PC 102. A printer driver converts data, which an application outputs, into print data interpretable by the MFP 101 based on the print instruction from the application, and transmits the print data to the MFP 101 via the network 100.

Note that, in the first embodiment, the PC 102 is exemplified as an example of the information processing apparatus, but it may be, for example, a mobile terminal, or the like, such as a smartphone or a tablet terminal. Accordingly, the network 100 is not limited to wired communication, and may be wireless communication. Additionally, a method in which print data is transmitted to the MFP 101 can be transformed appropriately. The print data may be transmitted to the MFP 101 via an application or a driver for printing, or the print data may be transmitted to the MFP 101 via a cloud server.

Next, a description is given for a configuration of the MFP 101.

The MFP 101 includes a reading function for reading an image on a sheet, and a printing function for printing an image onto a sheet. Further, the MFP 101 has a post-processing function for binding a plurality of printed sheets onto which images have been printed, aligning a plurality of printed sheets, and dividing the discharge destinations of a plurality of printed sheets into a plurality of trays. Note, the sheet includes plain paper, cardboard, a film, and the like.

Note, in the first embodiment, the MFP 101 is described as an example of an image forming apparatus, but it may be a printing apparatus, such as a printer having no reading function, for example. In the embodiment, as an example, the image forming apparatus is assumed to comprise various constituent features described below. Additionally, there may be a configuration in which a server 103 that includes some of the functions of the MFP 101 or other attached functions is added to the MFP 101. In this case, from the PC 102, it can be regarded that the server 103 provides functions of the MFP 101 via the network 100. The server 103 includes various similar input/output apparatuses that the PC 102 is provided with, such as a monitor 105, for example. In addition, even when such a server 103 is installed, the MFP 101 may be configured to be connectable directly to the network 100 using a network cable 104. Additionally, the MFP 101 is configured so that a plurality of apparatuses having respectively different roles can be connected to each other, and so that complicated sheet processing can be performed. A description regarding to each part constituting the MFP 101 will be given below.

Based on image data, a printer unit 203 uses toner to form (print) an image on a sheet that a sheet feed unit feeds. The configuration and operation principle of the printer unit 203 are as follows. A light beam, such as a laser beam, as an example, which is modulated in accordance with the image data, is reflected by a polygonal mirror (not shown) and irradiates a photosensitive drum (not shown) as scanning light. An electrostatic latent image formed by this laser light on the photosensitive drum is developed by toner, and this toner image is transferred onto a sheet that is attached to a transfer drum (not shown). By sequentially executing this series of image forming processes for toner of yellow (Y), magenta (M), cyan (C), and black (K), a full color image is formed on the sheet. Additionally, a configuration may be taken such that it is possible to transfer a spot color toner, transparent toner, or the like, in addition to these four colors. A sheet on the transfer drum, onto which the full-color image is formed in this manner, is conveyed to a fixing unit (not shown). The fixing unit includes a roller and a belt, or the like, incorporates a heat source, such as a halogen heater in the roller, and uses heat and pressure to melt the toner on the sheet, onto which the toner image is transferred, to fix the toner onto the sheet.

Note that a scanner unit 201 and a console unit 204, which is arranged on a top surface of the printer unit 203, are provided in the printer unit 203 of the MFP 101 according to the first embodiment. The console unit 204 provides various interfaces for cases in which a user performs various settings, operations, or the like, on the printer unit 203 according to the first embodiment.

Additionally, the MFP 101 is configured so that various additional devices can be attached in addition to the sheet feed unit 226 of the printer unit 203. A large-volume sheet feeding apparatus 220 is a paper feeder detachable from the printer unit 203. These feeding apparatuses include a plurality of a sheet feed unit 225. With such a configuration, the printer unit 203 can perform print processing on a sheet with a large capacity.

A processing apparatus 224 is arranged for applying stapling processing to a sheet bundle. As a type of staple binding, it is possible to perform binding in a form desired by an operator, such as one corner stitching, two-place binding, and saddle-stitching. The processed product is discharged to a tray 230 in a case of saddle-stitching, but is discharged to trays 228 and 229 in a case of one corner stitching, or two-place binding. Furthermore, the MFP 101 includes an inserter 221 suitable for inserting an insert sheet without print processing between sheets on which the printer unit 203 performs print processing. In addition, the MFP 101 includes a bookbinding processing apparatus 233 that is a processing apparatus for obtaining high-quality bookbinding products, and a processing unit 222 for performing processing on sheets, such as punches, creases, or the like. These various additional devices are configured usable at any time according to the contents and properties of a product that the user of the device generates.

The MFP 101 can be roughly divided into three parts with the printer unit 203 as a border. In FIG. 1, a device arranged on the right side of the printer unit 203 is called a sheet feeding apparatus, and the main role of the sheet feeding apparatus is to continuously supply sheets, which are loaded inside it, to the printer unit 203 at appropriate timings. Additionally, the sheet feeding apparatus also performs detection of a remaining amount of sheets loaded inside it. The sheet feed unit 226 is also present inside the printer unit 203, and performs functions equivalent to that of the sheet feeding apparatus. These sheet feed units 226 included by the printer unit 203 are also referred to as a sheet feeding apparatus in the description.

In contrast, a device arranged leftward of the printer unit 203 in FIG. 1 is referred to as a sheet processing apparatus, or a post-processing apparatus. A sheet processing apparatus applies various processings to a sheet for which print processing has completed, or performs processing, such as integration. The sheet feeding apparatus described above and the sheet processing apparatus are together referred to as a sheet processing apparatus 200 in the following description.

FIG. 2 is a block diagram for describing a configuration of the MFP 101 according to the first embodiment. Note that, the blocks illustrated in FIG. 2 are divided into units as a system, and, therefore, there are portions that do not necessarily correspond to units of the device configuration illustrated in FIG. 1.

The MFP 101 is provided with a nonvolatile memory, such as a hard disk 209 (hereafter, an HDD) that can store data of a job that is to be subject to a plurality of processings. Note that, in the first embodiment, although a description is given of an example in which the MFP 101 uses a hard disk, there is no limitation to a hard disk if there is a similarly large capacity and a nonvolatile storage apparatus. In addition, the MFP 101 has a copy function for storing image data accepted from the scanner unit 201 in the HDD 209, and reading the image data from the HDD 209 and printing it by the printer unit 203. The MFP 101 also has a print function for storing in the HDD 209 print data received from an external apparatus via an external interface (I/F) unit 202, which is an example of a communication unit, reading the print data from the HDD 209, and printing it by the printer unit 203. The MFP 101 is a multifunction peripheral (MFP) (printing apparatus) provided with a plurality of functions such as these. Note that the MFP 101 may be capable of color printing, or may be capable of monochrome printing.

The scanner unit 201 reads an original image, and subjects image data obtained by reading the original to image processing, and then outputs a result of the image processing. The external I/F unit 202 transmits and receives image data, or the like, to and from a fax machine, a network connected device, or an external dedicated device. The HDD 209 stores various pieces of management information, or the like, that is stored, changed, and managed by the MFP 101. The MFP 101 is also provided with the console unit 204 that has a display unit and corresponds to an example of a user interface unit. A control unit 205 that the MFP 101 is provided with has a central processing unit (CPU) 210, and the CPU 210 comprehensively controls processing, operation, or the like, of the various units that the MFP 101 is provided with. A read-only memory (ROM) 207 stores various control programs that are necessary in the first embodiment, including a program for executing various processing or the like, of flowcharts described later that are executed by the CPU 210 of the control unit 205. In addition, the ROM 207 also stores a display control program for causing the display unit of the console unit 204 to display various user interface screens (hereafter, UI screens), including a UI screen.

The CPU 210 of the control unit 205 deploys a program stored in the ROM 207 to a random access memory (RAM) 208 and executes the program to cause the MFP 101 to execute various operations according to the first embodiment. In addition, the ROM 207 also stores, for example, a program for executing an operation to interpret page description language (hereafter, PDL) data that the control unit 205 receives from an external apparatus via the external I/F unit 202, expanding it into raster image data (bitmap image data). Similarly, for example, a program for interpreting and processing a print job that the CPU 210 has received from an external apparatus via the external I/F unit 202 is also stored in the ROM 207. The ROM 207 stores in advance various programs, such as a program for a boot sequence, font information, or the like, and the foregoing programs. Details of various programs stored in the ROM 207 are described later. The RAM 208 is a memory that can be read from and written to, and stores, for example, setting information, various programs, and image data sent from the scanner unit 201 or the external I/F unit 202.

In addition, the HDD 209 stores image data that is compressed by a compression/decompression unit 206. The HDD 209 is configured to be able to hold a plurality of pieces of data, such as print data for jobs that are processing targets. The control unit 205 (the CPU 210) stores data of a job, which is to be a processing target and is input via various input units, such as the scanner unit 201 or the external I/F unit 202, in the HDD 209, and performs printing by reading this data from the HDD 209 and outputting it to the printer unit 203. Alternatively, the control unit 205 controls to transmit job data read from the HDD 209 to an external apparatus via the external I/F unit 202. In this way, the control unit 205 executes various output processing on data of a job that is a processing target and is stored in the HDD 209. The compression/decompression unit 206 compresses or decompresses image data, or the like, that is stored in the RAM 208 or the HDD 209 in accordance with various compression methods, such as Joint Bi-Level Image Experts Group (JBIG) or Joint Photographic Experts Group (JPEG). In addition, the control unit 205 also controls operation of the sheet processing apparatus 200. The sheet processing apparatus 200 corresponds to the sheet feeding apparatus and the sheet processing apparatus described with reference to FIG. 1.

Note that each block illustrated in FIG. 2 is mutually connected to the control unit 205 (the CPU 210) via a system bus. The system bus has sufficient capability to transmit and to receive various control signals, data, or the like, that is necessary to realize the functions provided by the MFP 101.

Figure 3A:
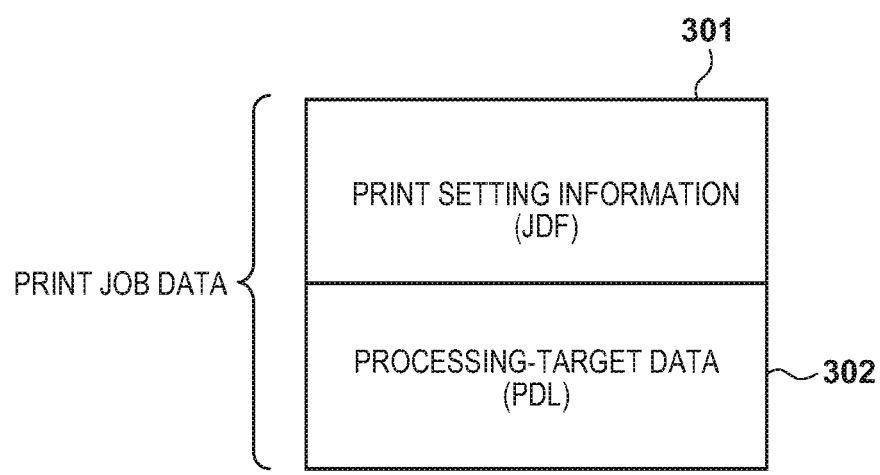
FIGS. 3A and 3B depict views illustrating a data configuration of a print job transmitted to the MFP from a personal computer (PC) according to the first embodiment.
Figure 3B:
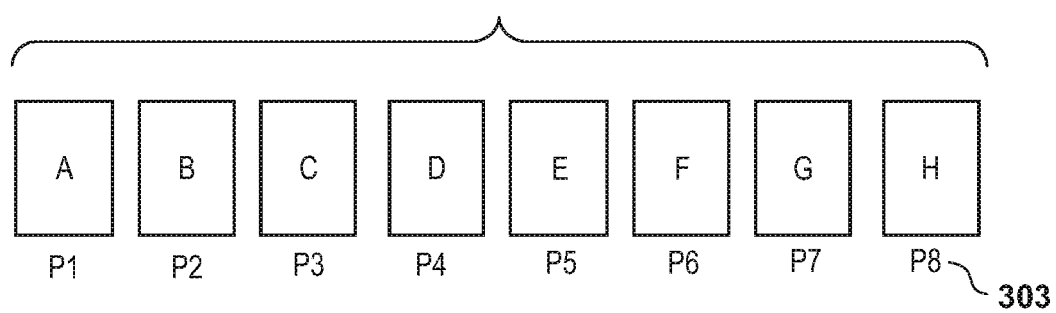

FIGS. 3A and 3B depict views illustrating a data configuration of a print job transmitted to the MFP 101 from the PC 102 according to the first embodiment.

FIG. 3A illustrates a data configuration of a print job. The data of this print job includes print setting information 301 and processing-target data 302. The former is data that stores setting data to control the form of a product when the MFP 101 processes a print job, and is written in a job definition format (JDF) in the first embodiment. The processing-target data 302 is image data used at a time of print processing, and is written in PDL here. In the first embodiment, the print setting information 301 and the processing-target data 302 are configured as respectively independent parts. These pieces of data are, however, transmitted as one piece of data when they are transmitted from the PC 102. In addition, when the MFP 101 receives a print job from the PC 102 via the external I/F unit 202, the control unit 205 separately processes these parts that are included in the print job. Details of this processing are described later with reference to flowcharts. Note that the print setting information 301 and the processing-target data 302 are temporarily held in the HDD 209 until they are processed by the control unit 205.

FIG. 3B depicts a view illustrating an example of a configuration of the processing-target data 302 illustrated in FIG. 3A, and illustrates a schematic view of image data that is written in PDL. Here, the data is configured by a total of eight pages, with each page including image data comprising one alphabet letter. The number of logical pages of the PDL data transmitted from the PC 102 is eight, but, in order to simplify the description of a function for designating and using a page, such as an insert sheet function, in the following description, illustration is made by appending a first page index (P1 to P8) 303 before N-in-one printing.

Figure 4A:
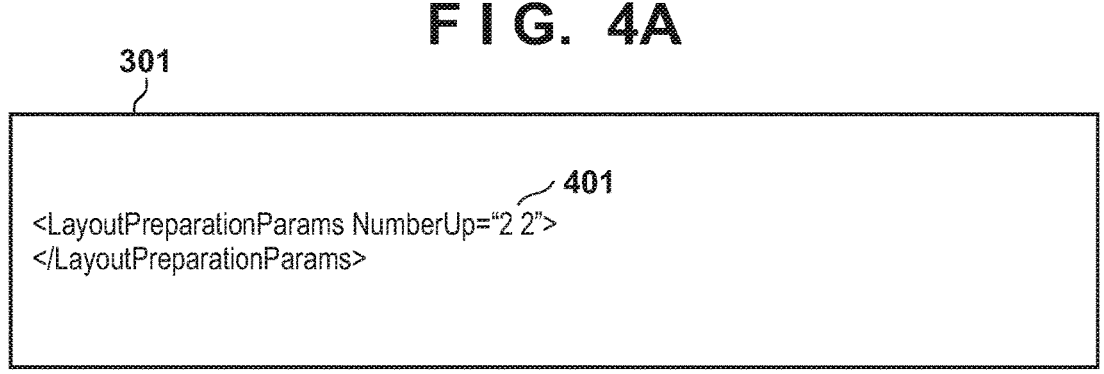
FIGS. 4A and 4B depict views illustrating an example of a command for instructing an N-in-one printing function included to the MFP according to the first embodiment and a result of the N-in-one printing.
Figure 4B:
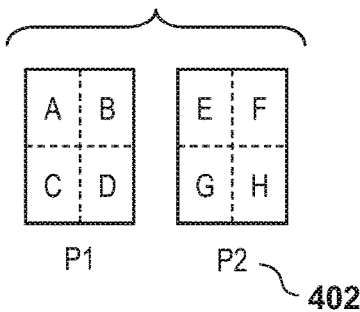

FIGS. 4A and 4B depict views illustrating an example of a command for instructing an N-in-one printing function included to the MFP 101 according to the first embodiment and a result of the N-in-one printing.

FIG. 4A illustrates an example of the print setting information 301 that is included in a print job transmitted from the PC 102. Here, illustration is given for an example of a case in which setting data is written in the JDF format. Processing to receive this data by the control unit 205 via the external I/F unit 202 is performed, the data is temporarily stored in the HDD 209, and is then read out and processed. The job setting information 301 and the processing-target data 302 are used when the CPU 210 of the control unit 205 reads out a PDL print job execution program that is stored in the ROM 207, and executes the PDL print job execution program. Note that although illustration is only given for the print setting information 301 including an N-in-one printing function setting, as a matter of course, the print setting information 301 illustrated in the same figure includes setting data corresponding to other functions when other functions that the MFP 101 has are to be executed. A state in which these other functions are omitted, however, is illustrated.

An N-in-one printing function setting 401 (NumberUp attribute of a LayoutPreparationParams tag) is "2 2". In other words, according to a JDF specification, this indicates that so-called 4-in-1 printing is designated, with the arrangement of logical pages after aggregation is to have "2" vertical and horizontal divisions, in other words to aggregate four pages to create a single aggregated page.

FIG. 4B depicts a view illustrating an example of page data after aggregation that is generated as a result of the control unit 205 executing the N-in-one printing function with 4-in-1 printing on the processing-target data of FIG. 3B, based on the job setting data of FIG. 4A.

In a case of executing N-in-one printing processing on eight pages by the 4-in-1 printing as described above, four original pages are aggregated to one sheet to generate images for a total of two sheets as illustrated by FIG. 4B. In addition, the number of pages after compositing in accordance with the aggregation processing is changed in accordance with the impact of the number of aggregated pages. Accordingly, in FIG. 4B, a second page index 402 for indicating the number of sheets (pages) that is the unit of sheets onto which images subject to N-in-one printing are printed is added. In other words, the images (A to D) for P1 to P4 are subjected to N-in-one printing and printed onto the first sheet, and images (E to H) for P5 to P8 are subject to N-in-one printing and printed on the second sheet.

Figures 5A, 5B:
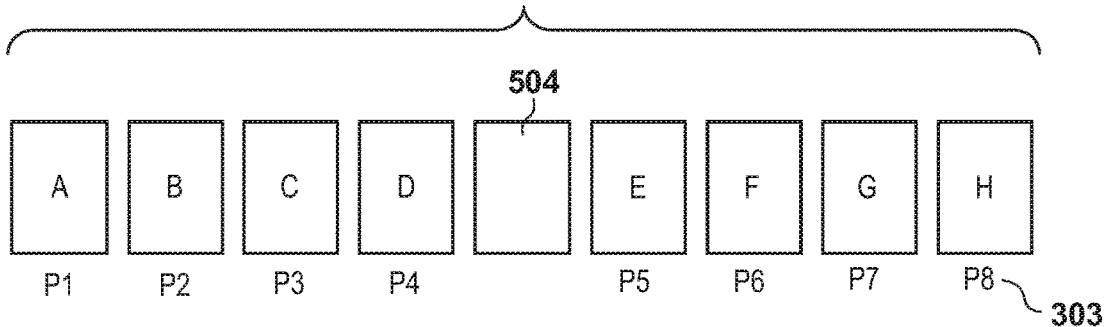
FIGS. 5A and 5B depict views illustrating an example of a command for instructing an insert sheet function included to the MFP according to the first embodiment and a result of inserting an insert sheet.

FIGS. 5A and 5B depict views illustrating an example of a command for instructing an insert sheet function included to the MFP 101 according to the first embodiment and a result of inserting an insert sheet.

FIG. 5A illustrates an example of the print setting information 301 transmitted from the PC 102. Description in common with description for FIG. 4A is omitted here. A setting for an insert sheet is written in the JDF format. To perform a setting for the insertion of an insert sheet, setting data includes an insert location 501 that indicates the insertion position of the insert sheet, and an insert sheet setting 502 for instructing that the insert sheet be inserted. The insert location 501 indicates a page position by "4-1", which indicates "immediately prior to the fifth page" in the JDF specification. Note that, in JDF, because the specification is such that a count of page numbers is counted from zero, although the insertion position differs from the insertion position in accordance with the description, this is due to the specification. The insert sheet setting 502 (an InsertSheet tag) includes a setting for an insert sheet. In the example of FIG. 4A, an insert sheet is a blank sheet, and a sheet type is an "insert sheet". In the first embodiment, descriptions of settings other than an insertion position are omitted. An insert sheet setting 503 specifies the type of a sheet to actually insert. In the example of FIG. 4A, the type of the sheet to insert is set to "MED_001".

As described above, setting data for the insert sheet function includes the insert location 501, the insert sheet setting 502, and the insert sheet setting 503.

P1 to P8 of FIG. 5B illustrate an example of page data for a product that is generated as a result of the control unit 205 executing a print job on the processing-target data 302 by using the insert sheet function, based on the print setting information of FIG. 5A, and based on the example of FIG. 3B.

In the example illustrated in FIGS. 5A and 5B, the N-in-one printing function is not used, and, therefore, even though the insert sheet function is applied, there is no change in the logical page index from before the application of the insert sheet function. In other words, it is the same as the first page index 303 of FIG. 3B, and the number of logical pages after the insert sheet function is applied is still "8". In FIG. 5B, however, an insert sheet 504 is inserted immediately prior to the designated fifth page. Accordingly, when the print setting information of FIG. 5A and the processing-target data illustrated FIG. 3B are processed by the MFP 101 and a print job is executed, a total of nine sheets including the insert sheet 504 are output in a case of single-sided printing.

Figures 6A, 6B:
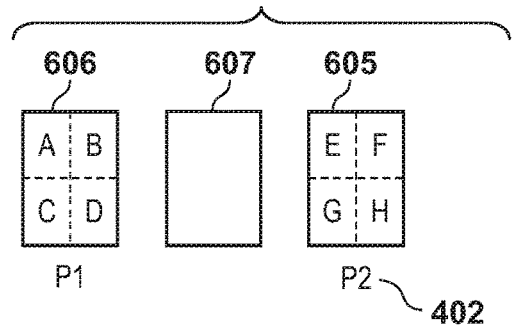
FIGS. 6A and 6B depict views illustrating an example of a command when the N-in-one printing function and an insert sheet function are designated at the same time and a result thereof.

FIGS. 6A and 6B depict views illustrating an example of a command when the N-in-one printing function and an insert sheet function are concurrently designated and a result thereof.

FIG. 6A illustrates an example of the print setting information 301 for which N-in-one printing and the insertion of an insert sheet are set. In FIG. 6A, an N-in-one printing setting is represented by an attribute 601 (a NumberUp attribute of a LayoutPreparationParams tag). A case of 4-in-1 printing is illustrated here. In addition, a setting for the insertion of an insert sheet is written by a tag 603 (an InsertSheet tag). In addition, an insertion position 602 is illustrated by 'RunIndex="4~-1"' (immediately prior to the fifth page). Similarly, an insert sheet setting 604 "MED_001" is designated for a sheet to be used for the insert sheet. The setting content for N-in-one printing and the insert sheet is the same as the example of FIGS. 4A and 4B and FIGS. 5A and 5B, which are described above.

As a result, it is possible to obtain a product as illustrated in FIG. 6B. Here, the first page to the fourth page are subject to N-in-one printing in accordance with 4-in-1 printing and are printed to a first sheet 606. Similarly the fifth page to the eighth page are subject to N-in-one printing in accordance with 4-in-1 printing and are printed to a second sheet 605, and a total of two sheets are obtained. Here, the position of the insert sheet is immediately prior to the fifth page. Because the leading page of the second sheet 605 corresponds to the fifth page (P5) in the first page index 303, an insert sheet 607 is inserted between the sheet 606 and the sheet 605. In this case, the insertion position of the insert sheet is not positioned between pages that are subject to N-in-one printing to be on one sheet, it is not necessary to blank the image of a page subsequent to the insertion position and to insert the insert sheet immediately after this sheet, as described in the problem to be solved of the present invention. Accordingly, in this example, by inserting the insert sheet 607 immediately prior to the fifth page, a product in which the insert sheet 607 has been inserted immediately prior to the second sheet 605 whose second page index 402 is "P2" is created.

FIGS. 7A through 7C depict views illustrating an example of a command when the N-in-one printing function and an insert sheet function are concurrently designated and a result thereof.

FIG. 7A illustrates an example of the print setting information 301 that includes settings in which an N-in-one printing function and an insert sheet function are concurrently designated. A difference with the JDF example illustrated in FIG. 6A is that, as indicated by reference numeral 701, the insertion position is designated as "3~-1", in other words it is designated that an insert sheet is inserted immediately prior to the fourth page. Other setting content for N-in-one printing and the insert sheet function is the same as in FIG. 6A.

FIG. 7B illustrates an example of a product for a case in which the setting content of the print setting information 701 illustrated in FIG. 7A is interpreted with no consideration given to whether or not it is physically possible to implement the settings. In other words, because pages are aggregated in spite of the fact that "2 2", namely, 4-in-one printing, is designated for N-in-one printing and an insert sheet immediately prior to the fourth page is designated, an insertion position 702 immediately prior to the fourth page after aggregation is not at a boundary between sheets. It goes without saying that this means a condition occurs in which insertion is physically impossible.

FIG. 7C depicts a view for describing a product of a case in which the print setting information of FIG. 7A is interpreted by a method of a conventional technique, and a portion of processing is changed in order to continue the execution of the job.

Conventionally, when the insertion position is not between sheets resulting from N-in-one printing, in other words when the insertion position is between pages in a sheet resulting from N-in-one printing, a blank is inserted for a page image that is subject to N-in-one printing. By this arrangement, ultimately control is performed so that the insertion position is between sheets. In other words, a blank page 703 is inserted at an insertion position immediately prior to an image D of the fourth page of the first sheet, and pages (D to G) are subject to N-in-one printing on the second sheet and are printed. A result in which an insert sheet 704 is inserted immediately prior to the second sheet, in other words immediately prior to the image D of the fourth page, is illustrated.

In this case, as described above, accompanying the insertion of a blank page on the first sheet, as a result the number of sheets that are printed increases from two to three, and, in spite of a desire to reduce the number of print sheets due to N-in-one printing, a desired result ceases to be obtainable.

Figures 8, 9:
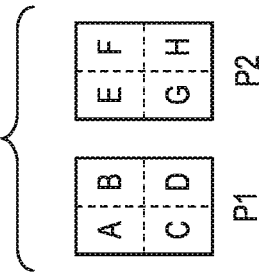
FIG. 8 depicts a view illustrating a result of the MFP according to the first embodiment processing the command of FIG. 7A.
FIG. 9 depicts a view for describing an example of an evaluation equation that is used for determining a case in which the N-in-one printing function and the insert sheet function can be used together and a case in which they cannot be used together in the MFP according to the first embodiment.

FIG. 8 depicts a view illustrating a result of the MFP 101 according to the first embodiment processing the command of FIG. 7A.

In FIG. 8, even when an instruction is made to insert an insert sheet immediately prior to the fourth page, in practice a product is generated without inserting the insert sheet. The reason is as described with reference to FIG. 7C. In this way, in a case in which N-in-one printing is set and an insertion position of an insert sheet is inappropriate, conventional insertion of a blank page that would impair an effect of aggregation described with reference FIG. 7C is not performed. In other words, a setting for an insert sheet is disabled under such conditions. In a case in which an insertion position setting would not cause a problem, however, for example as in FIGS. 6A and 6B, it is possible to insert an insert sheet at a designated position even if the N-in-one printing function is designated.

By this arrangement, first the insert sheet function and the N-in-one printing function are not subject to simple mutual exclusion, and it is possible to allow these functions to coexist in accordance with conditions.

With the insert sheet function, when an insertion position is designated such that it is not possible to make an insertion between sheets resulting from N-in-one printing, the insert sheet function is disabled. By this arrangement, it is possible to prevent the occurrence of a situation that goes against the desire of a user who uses the N-in-one printing function, the situation being the increase of a number of sheets, such as by the conventional insertion of an unnecessary blank page. Accordingly, in addition to it being possible to use both of the insert sheet function and the N-in-one printing function in accordance with conditions, when there is a risk of increasing the number of sheets, it is possible to suppress combined use of these functions and follow the desire of a user who uses the N-in-one printing function.

FIG. 9 depicts a view for describing an example of an evaluation equation that is used when determining a case in which the N-in-one printing function and the insert sheet function can be used together and a case in which they cannot be used together in the MFP 101 according to the first embodiment. In the figure, Y illustrates a result of the evaluation. Each parameter of the evaluation equation is described below.

If both of the N-in-one printing function and the insert sheet function are designated, Y indicates whether or not there is a valid setting, in other words whether the insertion position is at a position in which there is a good cutoff for the case in which the N-in-one printing function is used, and there is no necessity to insert an unnecessary blank page. When there is no necessity to insert an unnecessary blank page, Y indicates the insertion position in the second index after N-in-one printing. Meanwhile, if there is an invalid setting, in other words the insertion position corresponds to a position in which there is not a good cutoff using the aggregation function, Y is a predetermined value "−1" indicating that it is invalid. Note that this evaluation equation is obtained in accordance with a calculation based on conditions that are set when performing determination processing in a flowchart of FIG. 11, which is described below, and it is used in a determination in this flowchart.

N is the number of aggregated pages set for the N-in-one printing function. A page index for pages included in processing-target data before N-in-one printing is described as a first index, and a page index of composited pages generated after processing for N-in-one printing is described as a second index. X is a page position that indicates the insertion position of an insert sheet, and this page position is designated based on the first index.

For example, in the case of FIGS. 6A and 6B, which are described above, the number of aggregated pages N is "4", and the insertion position X is "5". Accordingly, in this case $Y=(X-1)/N+1=\{(5-1)/4\}+1=2$. Accordingly, in this case there is no necessity to insert a blank page, and the insertion position of an insert sheet is the second sheet after N-in-one printing. Accordingly, when the value of Y is a positive integer, it is possible to insert an insert sheet at the designated position without inserting a blank page, even if settings for the N-in-one printing function and the insert sheet function are included. In contrast, when the value of Y is a non-integer, it is not possible to insert an insert sheet at the designated position without inserting a blank page when settings for the N-in-one printing function and the insert sheet function are included.

In the first embodiment, when the N-in-one printing function and the insert sheet function are concurrently designated, a program corresponding to the equation illustrated in FIG. 9 is executed by the control unit 205, and a determination is made as to whether or not to apply these functions. By this arrangement, it is possible to make a determination and to control so as to produce results as illustrated by FIGS. 6A and 6B through FIG. 8. Note that, in the first embodiment, an example is given for an equation for performing the determination described above, but the present invention can be applied even if a different equation obtained by transforming this equation is used. In this case, it is sufficient if, when the insert sheet function and the aggregation function are combined, it is possible to determine the insertion position after aggregation for a case in which it is possible to insert an insert sheet to a designated position without inserting a blank page. For a case in which it is not possible to insert an insert sheet to a designated position without inserting a blank page, it is sufficient if something to that effect can be determined. Accordingly, a configuration may be such that a determination is made in accordance with combinations of these conditions, even if the equation described above is not used.

Figure 10:
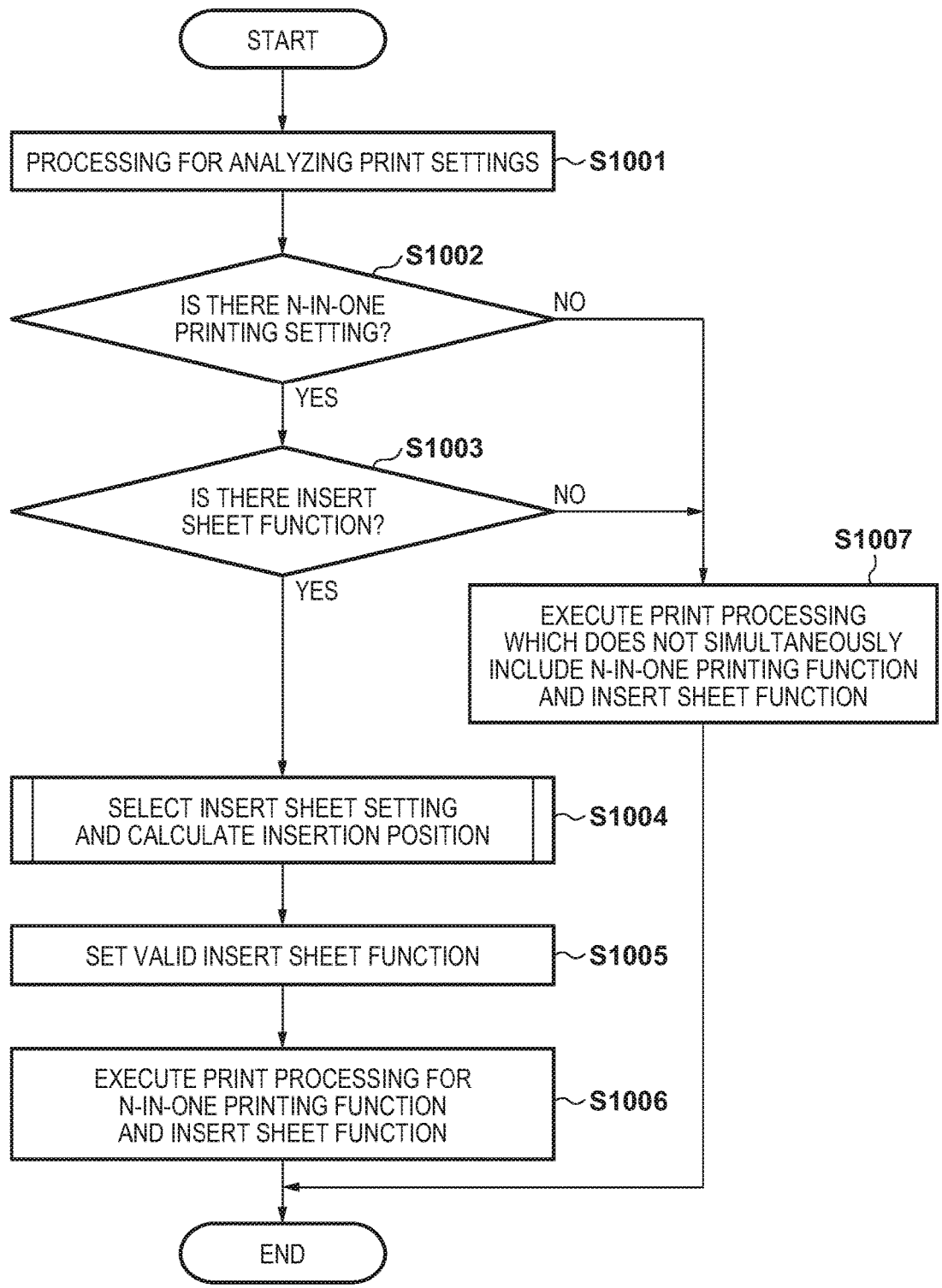
FIG. 10 is a flowchart for describing processing of the MFP according to the first embodiment to receive and to execute a print job.

FIG. 10 is a flowchart for describing processing of the MFP 101 according to the first embodiment to receive and to execute a print job. Note that processing illustrated by this flowchart is achieved by the CPU 210 executing a program that has been deployed to the RAM 208. Note that a print job here includes data including the print setting information 301 and the processing-target data 302 as described above with reference to FIG. 3A, for example.

Upon receiving print job data, the processing proceeds to step S1001, and the CPU 210 reads the print setting information 301 from the print job data, and executes processing for analyzing setting content thereof. This is done by the CPU 210 extracting the print setting information 301, which is a JDF format setting portion sent together with the print target data 302, as described with reference to FIGS. 4A and 4B through FIG. 8. In addition, this processing corresponds to processing for executing JDF syntax analysis to analyze and to obtain various pieces of setting information stored in the JDF format. The CPU 210 holds a result of this analysis in the RAM 208. Note that, in step S1001, although a configuration may be taken such that the CPU 210 performs processing for directly extracting the setting information from the data received by the external I/F unit 202, normally it is typical for the CPU 210 to execute processing for extracting the setting information from the data after the received data is temporarily stored in the HDD 209, or the like. In step S1001, any configuration may be taken.

Next, the processing proceeds to step S1002, and the CPU 210, as a result of analyzing and obtaining the print setting information 301 in step S1001, determines whether or not a setting for N-in-one printing is included in the various pieces of print setting information that were obtained. When a setting for N-in-one printing is not included, the processing proceeds to step S1007, the CPU 210 executes print processing for the case in which a page designation function and an N-in-one printing function are not concurrently included, and this processing ends. Note that, in a case in which the processing proceeds from step S1002 to step S1007, the CPU 210 executes print processing in accordance with the received print job. In other words, the CPU 210 reads a result of the print setting information 301 that was analyzed in step S1001 from the RAM 208, and performs analysis of image data, namely the processing-target data 302 that is PDL data, based on setting content. The CPU 210 then controls each unit that the MFP 101 is provided with, such as the compression/expansion unit 206, the printer unit 203, and the sheet processing apparatus 200, to execute a series of controls for rendering processing and creating a print product.

Meanwhile, when it is determined in step S1002 that a setting for N-in-one printing is included, the processing proceeds to step S1003, and the CPU 210, as a result of analyzing the print setting information 301 in step S1001, determines whether or not a setting for a function that designates and uses a specific page, such as an insert sheet function, is included as a print setting. Note that, in the first embodiment, an example of an insert sheet function is indicated as an example of a function that designates and uses a specific page. A function that designates and uses a specific page is not limited, however, to an insert sheet function. For example, in a JDF specification, it is possible to use an exceptional page function that uses a sheet different from that for the main document for a specific page (also referred to as a partition function), and this function corresponds to a function that designates and uses a specific page. Accordingly, the problem given by taking an insert sheet as an example is also common in the case in which it is determined in step S1001 that a media designation in accordance with an exceptional page is included in the print setting information 301, as a function for designating and using a specific page. Accordingly, the determination of step S1003 is not limited to an insert sheet function. To simplify the description, however, only a determination for the existence or absence of the insert sheet function is given here.

In step S1003, when the CPU 210 determines that the insert sheet function is not designated, the processing proceeds to step S1007. In this case, although the N-in-one printing function is set as a print setting, a function for designating and using a specific page, such as the insert sheet function, is not included. In other words, in this case there is no necessity to apply further discrimination processing to determine whether a combination with the N-in-one printing function, which was illustrated in an example, is possible or impossible in accordance with conditions. Accordingly, in this case, in step S1007 the processing described above is executed, and this processing ends. Note that, in a case of proceeding from step S1003 to step S1007, print processing that has no page designation function is executed. More specifically, a print job that has no setting for the insert sheet function and applies only the N-in-one printing function is executed. In other words, the CPU 210 reads a result of the print setting information 301 that was analyzed in step S1001 from the RAM 208, and performs analysis of image data, namely the processing-target data 302, which is PDL data, based on setting content. The CPU 210 then controls each unit with which the MFP 101 is provided, such as the compression/expansion unit 206, the printer unit 203, and the sheet processing apparatus 200, to execute a series of controls for rendering processing, N-in-one page generating processing and creating a print product. Accordingly, the series of control performed by step S1007 does not include execution of both the N-in-one printing function and the insert sheet function.

In step S1003, when the CPU 210 determines that the insert sheet function is designated, the processing proceeds to step S1004. For processing for step S1004 and thereafter, in accordance with the CPU 210 executing a determination that uses the equation of FIG. 9, upon determining that the insert sheet function can be used this function is applied, and upon determining that this function cannot be used, the designation of the function is disabled. In step S1004, the CPU 210 obtains the value of Y from the equation indicated in FIG. 9, based on settings for the number of aggregated pages for the N-in-one printing function and the insertion position for the insert sheet function. In accordance with the value of Y obtained based on the equation described earlier, an insert sheet function setting in which it is not physically possible to insert an insert sheet is excluded. Similarly, an insert sheet setting in which an insert sheet can be physically inserted from the relationship between the number of aggregated pages and the insertion position of the insert sheet is kept. The detail for the processing of step S1004 is described later with reference to the flowchart of FIG. 11.

An effect obtained thereby is as follows. As an example, a state in which the insert sheet function illustrated by the examples of FIGS. 6A and 6B and FIGS. 7A through 7C is set in a print job is envisioned. In this case, by step S1004, the insert sheet setting indicated by FIGS. 6A and 6B is accepted, and the insertion position is decided based on a result (Y) from the CPU 210 calculating the equation of FIG. 9. The insert sheet function setting of FIG. 7A is discarded, however, as invalid. As a result, print processing as illustrated by FIG. 8 is executed.

In step S1005, the CPU 210 updates the setting relating to the insert sheet of the print setting information 301, based on the insertion position for the insert sheet that was converted in step S1004. Next, the processing advances to step S1006, and the CPU 210 executes print processing that concurrently includes a page designation function and an aggregation function, and this processing ends. In other words, the CPU 210 performs analysis of the image data of the processing-target data 302, in other words the PDL data, based on results for the print setting information 301 that was analyzed in step S1001. The CPU 210 then controls each unit with which the MFP 101 is provided, such as the compression/expansion unit 206, the printer unit 203, and the sheet processing apparatus 200, to execute a series of controls for creating a print product, such as rendering processing and N-in-one page generating processing. The series of control performed in step S1006, however, includes execution of both the N-in-one printing function and the insert sheet function. Furthermore, as a result of the CPU 210 executing step S1004, a product is generated such that an insert sheet is inserted in a state in which there is a conversion to an insertion position having a good cutoff in accordance with the number of aggregated pages, and an insert sheet is not inserted at an insert location in which there is a bad cutoff. In addition, it is possible to obtain a product resulting from suppressing the creation of unnecessary blank pages as illustrated by FIG. 7C.

Figure 11:
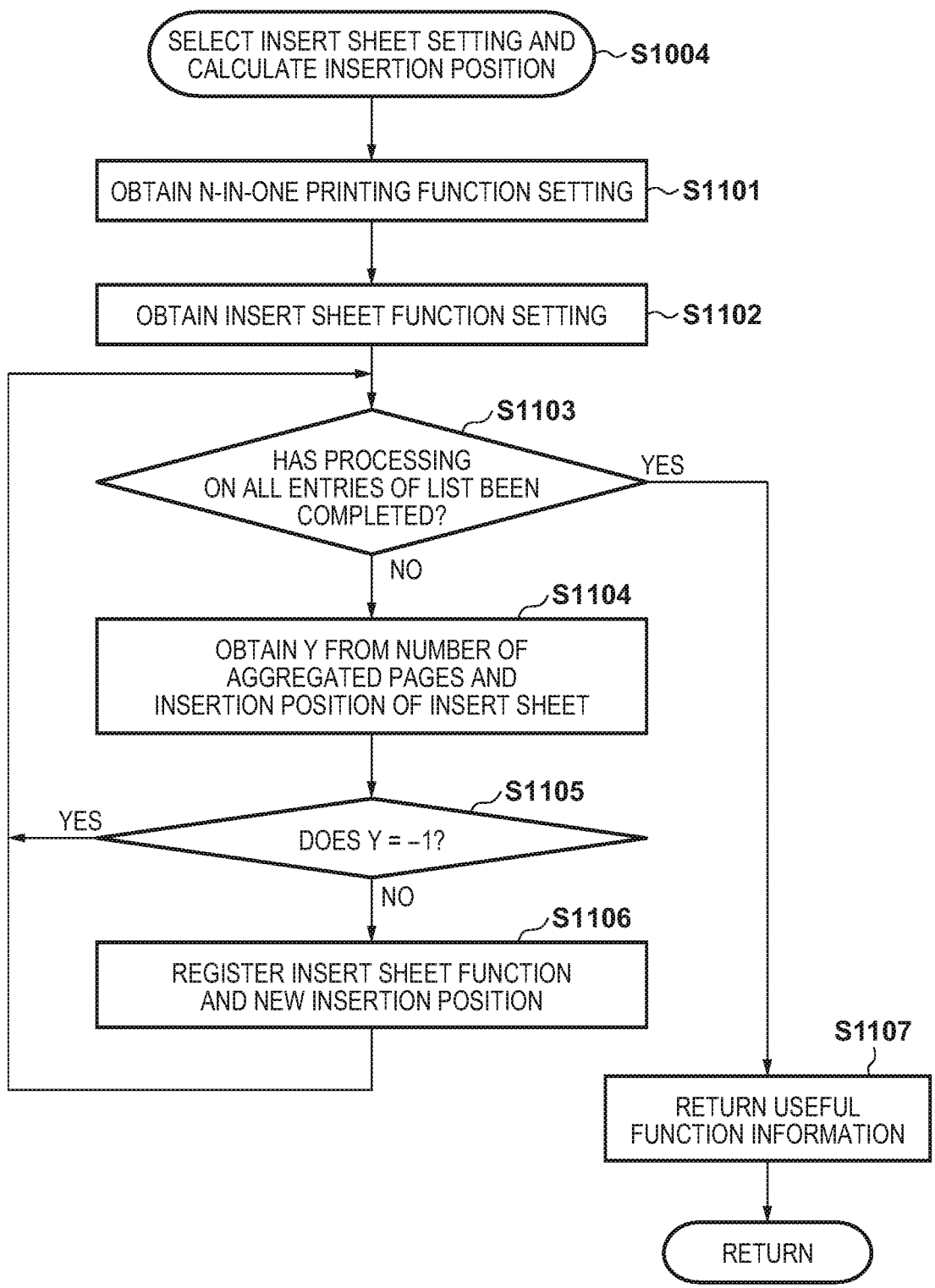
FIG. 11 is a flowchart for describing in detail processing of step S1004 of FIG. 10.

FIG. 11 is a flowchart for describing in detail the processing of step S1004 of FIG. 10.

When this processing is started, first, in step S1101, the CPU 210 obtains information of the number of aggregated pages based on the result of the analysis in step S1001 described earlier. Next, the processing advances to step S1102, and the CPU 210 obtains the insert sheet function setting based on the result of the analysis in step S1001. Here, because it is possible to set a plurality of insert sheets, the information obtained here is obtained in a list. Specifically, in a case in which a plurality of insert sheet function settings are written in the print setting information 301, for example, each insert sheet function setting is accumulated by the CPU 210 and held in the RAM 208 as a list. For information of the plurality of insert sheet function settings held here, the same processing is applied with respect to each item of the list, by the CPU 210 performing loop processing when executing subsequent processing.

In step S1103, the CPU 210 examines loop end conditions so that the CPU 210 applies the same processing to each item relating to the insert sheet function settings accumulated in step S1102 described above and stored in the RAM 208. Step S1103 through step S1106 correspond to a portion for the loop processing. When processing for all entries of the list has ended in step S1103, the processing advances to step S1107. In step S1107, as a result of the processing from step S1103 to step S1106, the CPU 210 returns information of valid insert sheet function settings that are stored in the RAM 208 to the main processing of the print processing of FIG. 10, and this processing ends. Note that a configuration may be taken, for an insert sheet function setting that is Y=−1 in step S1105, to set a value (for example, "−1"), or the like, that indicates that an insertion position is invalid.

When processing has not ended for all entries of the list in step S1103, the processing advances to step S1104, and the CPU 210 retrieves a single item of the list extracted in step S1102 from the RAM 208. The equation illustrated in FIG. 9 is used to execute a calculation and obtain Y. Specifically, the number of aggregated pages (N) obtained in step S1101 and the insertion position (X) of the item for the insert sheet function setting obtained in step S1104 are obtained from the RAM 208. The function of FIG. 9 is executed by substituting these values for N and X to obtain the calculation result Y.

Next, the processing proceeds to step S1105, and the CPU 210 determines whether or not Y, which is the calculation result of step S1104, is "−1". Here, if Y=−1, because the insertion position of the insert sheet corresponds to a condition in which insertion is not possible if a blank page is not inserted, the processing advances to step S1103 without registering this case. Meanwhile, if Y is not "−1" in step S1105, in other words when the insert sheet function and the aggregation function are combined and when it is possible to insert an insert sheet at the designated position without inserting a blank page, this insert sheet function setting is set to valid, and the processing advances to step S1106. In step S1106, the CPU 210 stores a new insert sheet insertion position, which is indicated by the insert sheet setting and Y obtained by the equation of FIG. 9 in the RAM 208, and the processing advances to step S1103.

By virtue of the first embodiment as described above, when the insert sheet function and the aggregation function are combined and when it is possible to insert the insert sheet at the designated position without inserting a blank page, it is possible to achieve both the insert sheet function and the aggregation function. When the insert sheet function and the aggregation function are combined, however, and when it is not possible to insert the insert sheet at the designated position without inserting a blank page, it is possible to invalidate the insert sheet function setting.

By this arrangement, as a result it is possible to control so that the number of printed sheets of a product does not increase, and it is possible to realize the coexistence of functions in a form in which an effect of reducing a number of printed sheets, which is the original intention of N-in-one printing, is not impaired.

Second Embodiment

Next, an explanation is given regarding the second embodiment of the present invention. In the first embodiment described above, a description was given of an example of combining an N-in-one printing function and an insert sheet function as an example of a function that designates and uses a page. In contrast to this, in the second embodiment, a description is given of an example in which a different function is taken as a function that designates and uses a page. Specifically, a description is given by an example of combining an aggregation function and an exceptional page function for a sheet that uses a sheet of a different type than that of the main document for a specific page. In addition, in the second embodiment, a description is given for an example of a method for solving the problem to be solved that differs from the method of the first embodiment, for the case in which the N-in-one printing function and a function that designates and uses a page are concurrently designated. Note that because the configuration of the print processing system and the configuration of the MFP 101 according to the second embodiment are similar to that of the first embodiment described above, a description thereof is omitted.

Figures 12A, 12B:
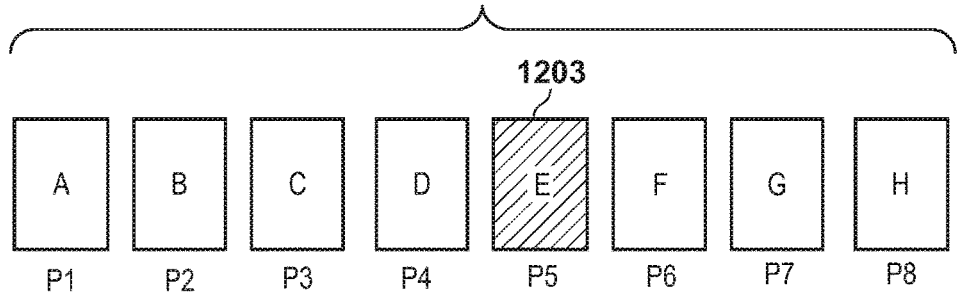
FIGS. 12A and 12B depict views for describing an example, in a second embodiment, in which an exceptional page function is used to have a sheet used as a specific page be a sheet that differs from other sheets of a main document.

FIGS. 12A and 12B depict views for describing an example, in the second embodiment, in which an exceptional page function is used to have a sheet used as a specific page be a sheet that differs from other sheets of a main document.

FIG. 12A depicts a view that illustrates an example of the print setting information 301 of print job data that includes an exceptional page function setting. Here, illustration is given for an example in which setting data is written in the JDF format. In the following description, a description that overlaps with that of the first embodiment is omitted.

The designation for a specific page is designated to the fifth page in RunIndex="4~4" 1201, and the type of the sheet to use for the fifth page is designated by "MediaRef" 1202.

FIG. 12B illustrates an example of a product generated by the MFP 101 executing print processing in combination with the processing-target data 302 of FIG. 3B, in accordance with the print setting information of FIG. 12A. As in the figure, a sheet 1203 for the fifth page differs from sheets for the other pages, and the type of the sheet 1203 is designated by the reference numeral 1202. This is a notation for clearly illustrating and describing the effect of the invention, however, and does not necessarily express the actual color of a sheet applied for the fifth page of the actual product.

FIGS. 13A through 13D depict views illustrating examples in which an N-in-one printing setting and an exceptional page function are used in the second embodiment.

FIG. 13A depicts a view illustrating a different example of the print setting information 301 of print job data that includes an exceptional page function setting. A difference with FIG. 12A is that an N-in-one printing setting 1301 for 4-in-1 printing is further included in addition to the settings of FIG. 12A. Descriptions for settings 1302 and 1303 that overlap with settings in FIG. 12A are omitted.

An aggregation function for two columns for each of vertical and horizontal directions, in other words a number of aggregated pages set to 4 (4-in-1 printing) in accordance with 'NumberUp="2 2"' 1301 and, similarly to FIG. 12A, exceptional page settings 1302 and 1303 for setting the sheet for the fifth page to a sheet of a designated type are included.

FIGS. 13B to 13D depict views for describing a concept for a product generated in accordance with the print setting information of FIG. 13A.

FIG. 13B illustrates an example based on an interpretation in which a different sheet is applied only for a portion 1304 that corresponds to the fifth page in the composited pages after aggregation, and the sheets for the main document are used for other portions. In this case, it goes without saying that applying the different sheet type for only the portion 1304 in the same plane is physically impossible. Accordingly, in the second embodiment, a solution in a different form is presented as a method for allowing the coexistence of functions when concurrently applying an N-in-one printing function and a function for designating and using a specific page.

FIG. 13C illustrates an example of the form of a product obtained as a result of processing the processing-target data illustrated by FIG. 3B in accordance with the print setting information illustrated by FIG. 13A, in the second embodiment. Here, the entirety of a sheet 1305, which results from N-in-one printing and includes the fifth page, and for which there was a setting to apply a different sheet to a portion thereof, is configured by the different sheet. In other words, a method that does not perform processing that is physically impossible, such as applying a different sheet type for only the portion 1304, as in FIG. 13B, and does not add a sheet 1306 that includes a blank page and the fifth page after aggregation, as in FIG. 13D, is proposed.

With this arrangement, coexistence of an N-in-one printing function and an exceptional page function in which there is no increase in the number of sheets printed as in FIG. 13C and without the addition of the new sheet 1306 as in FIG. 13D is realized.

A description is given by the following equation of an example of an evaluation equation that is used when determining a case in which the N-in-one printing function and a function that designates and uses a specific page can be used together and a case in which they cannot be used together in the MFP 101 according to the second embodiment.

$$Y=\text{Trunc}[\{(X-1)/N\}+1] \quad \text{Equation (1)}$$

Here, when the combination of the N-in-one printing function and the exceptional page function is designated, Y indicates a page after compositing for applying an exceptional page to a composited page after aggregation. N is the number of aggregated pages set for the N-in-one printing function. A page index for pages included in processing-target data before aggregation is distinguished and described below as a first index, and a page index of composited pages generated after aggregation processing is performed is distinguished and described below as a second index. X is the page position in which an exceptional page is to be applied, and is designated based on the first index. Based on the above description, Y indicates the position in which the exceptional page function is to be actually applied, in accordance with the second index, to composited pages in a state of having been subject to N-in-one printing. A difference with the function illustrated in FIG. 9 is that, by the Trunc function, which truncates fractional part of a result of calculating the equation {(X−1)/N+1}, a second index Y for applying an exceptional page is obtained. By this arrangement, even in the case of processing the print setting information illustrated by FIG. 13A, it is possible to obtain a product as in FIG. 13C.

Specifically, description is given by an example of applying the print setting information illustrated by FIG. 13A, for example. Here, N=4 and X=5, so Y=2. Accordingly, the position in which the exceptional page function is applied is the second page for composited pages in a state of having been subject to N-in-one printing. This corresponds to the sheet 1305 of FIG. 13C. Similarly, even with the value of X being any of 5 through 8, by applying the foregoing equation, the position in which the exceptional page function is applied is the sheet 1305 for the second page of composited pages that are in a state of having been subject to N-in-one printing, as in FIG. 13B.

Figure 14:
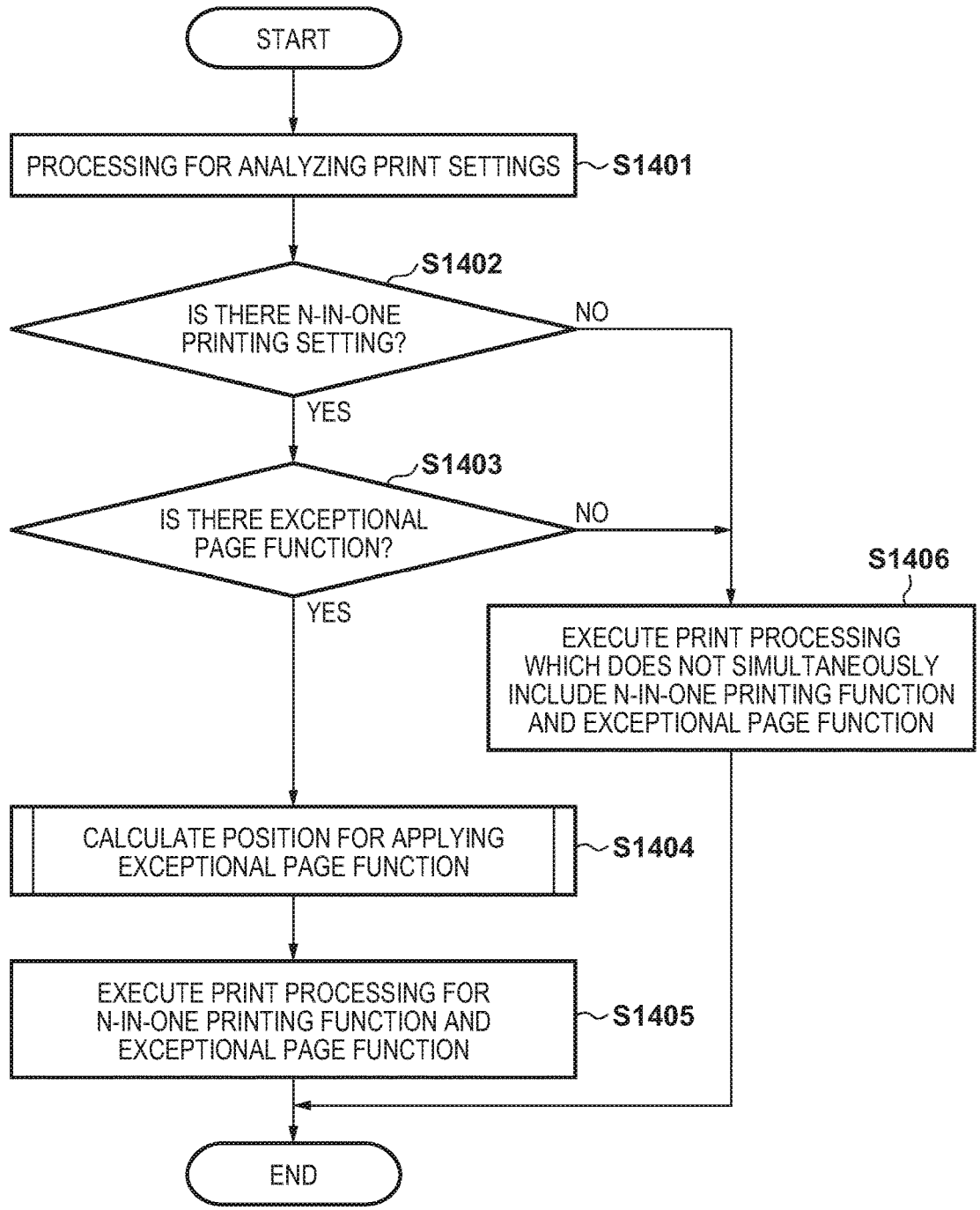
FIG. 14 is a flowchart for describing processing of the MFP according to the second embodiment to receive and to execute a print job.

FIG. 14 is a flowchart for describing processing of the MFP 101 according to the second embodiment to receive and to execute a print job. Note that processing illustrated by this flowchart is achieved by the CPU 210 executing a program that has been deployed to the RAM 208. Note that a print job here includes data including the print setting information 301 and the processing-target data 302 as described above with reference to FIG. 3A, for example.

Upon receiving print job data, the processing proceeds to step S1401, and, similarly to step S1001 of FIG. 10, the CPU 210 reads the print setting information 301 of the print job data, and executes processing for analyzing setting content thereof. Next, the processing proceeds to step S1402, and the CPU 210, as a result of analyzing and obtaining the print setting information 301, determines whether or not a setting for N-in-one printing is included in the various pieces of print setting information that were obtained. When a setting for N-in-one printing is not included, the processing proceeds to step S1406, the CPU 210 executes print processing for the case in which a page designation function and an N-in-one printing function are not concurrently included, and this processing ends. Note that, in a case in which the processing proceeds from step S1402 to step S1406, the CPU 210 executes print processing in accordance with the received print job.

Meanwhile, when it is determined in step S1402 that a setting for N-in-one printing is included, the processing proceeds to step S1403, and the CPU 210, as a result of analyzing the print setting information 301 in step S1001, determines whether or not a setting for a function that designates and uses a specific page, such as an exceptional page function, is included as a print setting. In step S1403, when the CPU 210 determines that the exceptional page function is not designated, the processing proceeds to step S1406. In this case, although the N-in-one printing function is set as a print setting, a function for designating and using a specific page is not included. In other words, in this case, there is no necessity to apply further discrimination processing to determine whether a combination with the N-in-one printing function, which was illustrated in an example, is possible or impossible in accordance with conditions. Accordingly, in this case, in step S1406 the processing described above is executed, and this processing ends. Note that, in a case of proceeding from step S1403 to step S1406, print processing that has no page designation function is executed.

When the CPU 210 determines in step S1403 that the insert sheet function is designated, the processing proceeds to step S1404. In step S1404, by the CPU 210 executing a calculation based on Equation (1) described above, the position for applying the exceptional page function is obtained. Details for the processing of step S1404 are described later with reference to the flowchart of FIG. 15.

Next, the processing advances to step S1405, and the CPU 210 executes print processing that concurrently includes the exceptional page function and the aggregation function, based on the application position for the exceptional page function obtained in step S1404, and then this processing ends. As a result, it is possible to obtain a product as illustrated in FIG. 13C.

Figure 15:
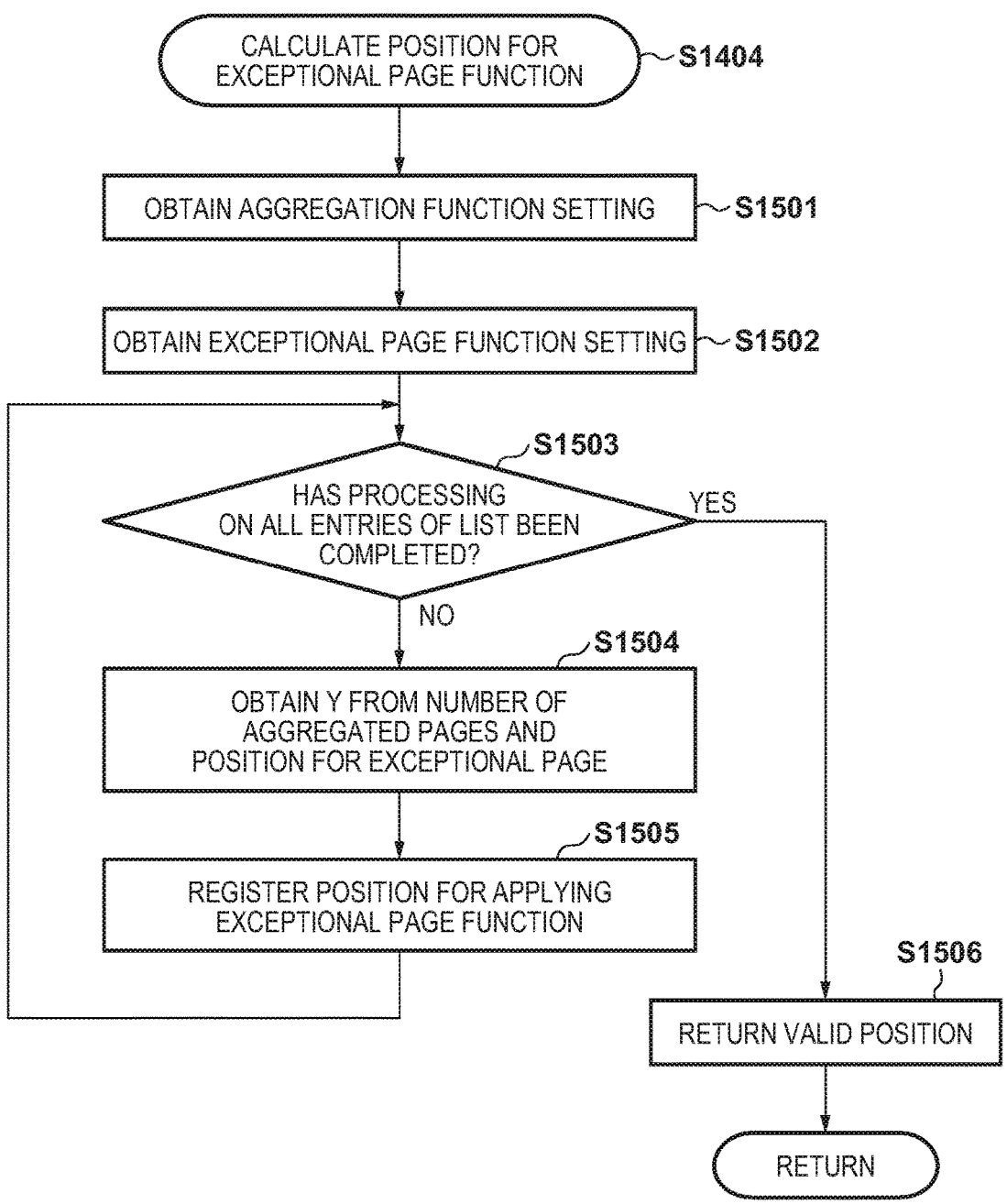
FIG. 15 is a flowchart for describing in detail processing of step S1404 of FIG. 14.

FIG. 15 is a flowchart for describing in detail processing of step S1404 of FIG. 14.

When this processing is started, first, in step S1501, the CPU 210 obtains information of the number of aggregated pages based on the result of the analysis in step S1401 described earlier. Next, the processing advances to step S1502, and the CPU 210 obtains the exceptional page function setting based on the result of the analysis in step S1401. Here, because it is possible to have a plurality of settings for the exceptional page function, the information obtained here is obtained in a list.

Next, the processing proceeds to step S1503, and the CPU 210 examines loop end conditions so that the CPU 210 applies the same processing to each item relating to the exceptional page function settings accumulated in step S1502 described above and stored in the RAM 208. Step S1503 through step S1505 correspond to a portion for the loop processing. When processing for all entries of the list has ended in step S1503, the processing advances to step S1506. In step S1506, as a result of the processing from step S1503 to step S1505, the CPU 210 returns information of valid exceptional page function settings that are stored in the RAM 208 to the main processing of the print processing of FIG. 14, and this processing ends.

When processing has not ended for all entries of the list in step S1503, the processing advances to step S1504, and the CPU 210 retrieves a single item of the list extracted in step S1502 from the RAM 208. Equation (1) described above is used to execute a calculation and to obtain Y. Specifically, the number of aggregated pages (N) obtained in step S1501 and the insertion position (X) of the item for the exceptional page function setting obtained in step S1504 are obtained from the RAM 208. A calculation for Equation (1) is executed by substituting respective values for N and X to obtain the calculation result Y. Next, the processing advances to step S1505, and the CPU 210 stores Y, which is the calculation result of step S1504, in the RAM 208 as the position for applying the exceptional page function, and the processing proceeds to step S1506.

By virtue of the second embodiment as described above, coexistence of an N-in-one printing function and an exceptional page function in which there is no increase in the number of sheets printed as in FIG. 13C and without the addition of a new sheet as in FIG. 13D can be realized.

Note that, in the second embodiment, the exceptional page function is also applied for images (F to H) other than the image (E) of the fifth page for which the exceptional page function is designated. If a user does not desire this, for example, it is sufficient if a product as in FIG. 13D is generated, or coexistence of the N-in-one printing function and the exceptional page function is subject to mutual exclusion.

Third Embodiment

Next, an explanation is given regarding the third embodiment of the present invention. In the third embodiment, consideration is given for a case in which, when the N-in-one printing function is designated and a plurality of pages are composited on the same sheet and printed, the exceptional page function is designated for a page that is designated in the plurality of pages that have been aggregated. A description is given for another example of resolving a mismatch without performing, for example, an insertion of an unnecessary blank page, even in this case. Note that because the configuration of the print processing system and the configuration of the MFP 101 according to the third embodiment are similar to that of the first embodiment described above, a description thereof is omitted.

In the third embodiment, consideration is given for a method of, when, out of aggregated pages that are included in the same sheet, settings for most pages are applied to all aggregated pages, for example. For example, when printing is performed by 4-in-1 printing, if the same exceptional page settings are set for three page images out of the four page images that are to be printed after being subject to N-in-one printing, these exceptional page settings are applied to the sheet for which the four images subject to N-in-one printing are to be printed.

Alternatively, consideration may be given for a method for taking page settings that are explicitly designated as a representative out of pages that are aggregated to the same sheet, and applying these page settings to all pages included in the aggregated pages. For example, when printing is performed by 4-in-1 printing, if there is an instruction to apply exceptional page settings set for an image of a first page for example out of the four page images that are to be printed after being subject to N-in-one printing, these exceptional page settings are applied to the sheet for which the four images subject to N-in-one printing are to be printed.

Furthermore, a configuration may be taken such that, when an aggregation function and a function for designating and using a page are concurrently set and a condition matching a case, such as FIG. 7C or FIG. 13D, for example, is detected, the MFP 101 performs a warning on the console unit 204 before executing print processing. A configuration may be taken such that, in response to a user instruction corresponding to the warning, a determination is made whether to continue the print processing unchanged, or to cancel the print processing.

Furthermore, a configuration may be taken such that, with respect to details for which a warning is made on the console unit 204, a user performs one of a plurality of methods for resolving a mismatch as described above to thereby enable the start of print processing. In such a case, consideration may be given for a method of displaying on the console unit 204 an operation screen for enabling a setting change by a user, and enabling print processing after the user has been allowed to make an explicit selection.

OTHER EMBODIMENTS

Embodiments of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or the apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A printing apparatus operable to receive a print job and to perform printing, the printing apparatus comprising:
   (A) a memory device that stores a set of instructions; and
   (B) at least one processor that executes the instructions stored in the memory to cause the printing apparatus to function as:
   (a) a determination unit configured to determine whether or not the print job includes an N-in-one printing setting and a setting of a function for designating a page position and executing the function with respect to the page position;
   (b) an obtaining unit configured to obtain, when the determination unit determines that the print job includes the N-in-one printing setting and the setting of the function, based on a number of aggregated pages of the N-in-one printing and the page position, a position after laying out for the the N-in-one printing for executing the function; and
   (c) a control unit configured to execute, in a case in which the position can be specified based on a unit of a sheet on which an image after N-in-one printing is to be printed, printing in accordance with the print job, and, in a case in which the position cannot be specified based on the unit of sheet, to control to perform printing of the print job by enabling only the N-in-one printing setting.

2. The printing apparatus according to claim 1, wherein the case in which the position after laying out for N-in-one printing for executing the function cannot be specified based on the unit of the sheet is a case in which the position obtained by the obtaining unit is between pages to be aggregated to one sheet.

3. The printing apparatus according to claim 1, wherein, letting a number of aggregated pages be N and the page position be X, in a case in which a calculation result of an equation $[\{(X-1)/N\}+1]$ is an integer, the control unit determines that it is possible to specify the position based on the unit of the sheet onto which an image after N-in-one printing is to be printed, and, in a case in which the calculation result is a non-integer, the control unit determines that it is not possible to specify the position based on the unit of the sheet onto which an image after N-in-one printing is to be printed.

4. The printing apparatus according to claim 1, wherein the function comprises an insert sheet function for inserting an insert sheet.

5. The printing apparatus according to claim 1, wherein the function comprises an exceptional page function for applying, to a designated page, settings different from settings for other pages.

6. A printing apparatus operable to receive a print job and to perform printing, the printing apparatus comprising:
   (A) a memory device that stores a set of instructions; and
   (B) at least one processor that executes the instructions stored in the memory to cause the printing apparatus function as:

(a) a determination unit configured to determine whether or not the print job includes an N-in-one printing setting and a setting of an exceptional page function for designating a page position and executing the exceptional page function with respect to the page position;

(b) an obtaining unit configured to obtain, when the determination unit determines that the print job includes the N-in-one printing setting and the setting of the exceptional page function, based on a number of aggregated pages of the N-in-one printing and the page position, a printing page position after laying out for the N-in-one printing; and (c) a control unit configured to control so as to execute printing in accordance with the print job to execute the exceptional page function to the print page position obtained by the obtaining unit.

7. The printing apparatus according to claim 6, wherein, letting a number of aggregated pages be N and the page position be X, the control unit applies the exceptional page function to the print page position indicated by Y obtained by $Y=\text{Trunc}[\{(X-1)/N\}+1]$, and wherein the exceptional page function is a function for changing a print setting for the print page position indicated by Y.

8. The printing apparatus according to claim 6, wherein, in a case in which a common exceptional page function is not set for pages that are to be printed, after being subject to N-in-one printing, on a print page corresponding to the print page position obtained by the obtaining unit, the control unit executes an exceptional page function that is most numerous, out of exceptional page functions for each page included in the print page.

9. The printing apparatus according to claim 6, wherein the at least one processor further executes the instructions to cause the printing apparatus to function as (d) a designation unit configured to designate an exceptional page function to execute with respect to the print page position obtained by the obtaining unit, and wherein the control unit executes the exceptional page function designated by the designation unit to a print page corresponding to the print page position obtained by the obtaining unit.

10. A method of controlling a printing apparatus operable to receive a print job and to perform printing, the method comprising:

determining whether or not the print job includes an N-in-one printing setting and a setting of a function for designating a page position and executing the function with respect to the page position;

obtaining, upon determining that the print job includes the N-in-one printing setting and the setting of the function, based on a number of aggregated pages of the N-in-one printing and the page position, a position after laying out for the N-in-one printing for executing the function; and executing printing, in a case in which the position can be specified based on a unit of a sheet on which an image after N-in-one printing is to be printed, in accordance with the print job, and, in a case in which the position cannot be specified based on the unit of sheet, controlling to perform printing of the print job by enabling only the N-in-one printing setting.

11. A non-transitory computer readable storage medium storing a program for causing a processor to execute a method of controlling a printing apparatus operable to receive a print job and to perform printing, the method comprising:

determining whether or not the print job includes an N-in-one printing setting and a setting of a function for designating a page position and executing the function with respect to the page position;

obtaining, upon determining that the print job includes the N-in-one printing setting and the setting of the function, based on a number of aggregated pages of the N-in-one printing and the page position, a position after laying out for the N-in-one printing for executing the function; and executing printing, in a case in which the position can be specified based on a unit of a sheet on which an image after N-in-one printing is to be printed, in accordance with the print job, and, in a case in which the position cannot be specified based on the unit of sheet, controlling to perform printing of the print job by enabling only the N-in-one printing setting.

* * * * *